United States Patent [19]

Hasegawa et al.

[11] Patent Number: 5,281,570

[45] Date of Patent: Jan. 25, 1994

[54] THERMOCHROMIC MATERIALS

[75] Inventors: Kiyoharu Hasegawa; Yoshimitsu Tanabe, both of Yokohama; Kazuyoshi Kikkawa, Kamakura; Masakatsu Nakatsuka, Yokohama; Akihiro Yamaguchi, Kamakura, all of Japan

[73] Assignee: Mitsui Toatsu Chemicals, Incorporated, Tokyo, Japan

[21] Appl. No.: 916,790

[22] Filed: Jul. 22, 1992

[30] Foreign Application Priority Data

Jul. 22, 1991 [JP]  Japan .................................. 3-181159
Sep. 13, 1991 [JP]  Japan .................................. 3-234415

[51] Int. Cl.$^5$ .............................................. B41M 5/28
[52] U.S. Cl. ................................. 503/216; 428/402.2; 503/201
[58] Field of Search ............... 503/208, 209, 216, 225, 503/201, 215, 217; 428/402.2, 402.21, 402.22

[56] References Cited

U.S. PATENT DOCUMENTS 2,324,671  7/1943  Bernstein ............................. 106/29
3,560,229  2/1971  Farnham et al. ..................... 106/21
4,028,118  6/1977  Nakasuji et al. .................... 106/21

FOREIGN PATENT DOCUMENTS 57-65772  4/1982  Japan .................................. 503/216

Primary Examiner—Pamela R. Schwartz
Attorney, Agent, or Firm—Millen, White, Zelano, & Branigan

[57] ABSTRACT

A reversible thermochromic material, preferably in the form of a microcapsule, comprising:
(a) an electron donative color former;
(b) a sulfide, sulfoxide or sulfone containing a hydroxy phenyl radical; and
(c) a chemical compound selected from alcohols, esters, ethers, ketones, carboxylic acids or acid amides, chromatizes very brightly and in a dense color, generates a change of chromic hue (colored - colorless) within a narrow temperature range and provides a stable thermochromatism on a long term basis.

12 Claims, No Drawings

THERMOCHROMIC MATERIALS

BACKGROUND OF THE INVENTION

1) Field of the Invention

The present invention relates to a coloring agent that metachromatizes sensitively and reversibly in response to temperature changes.

2) Description of the Related Art

A reversible thermochromic material is a material that metachromatizes near a prescribed temperature and utilizes this characteristic in such fields as articles requiring a suitable temperature or a warning or danger temperature indication, and merchandise to enjoy changes in colors, and can be used for example in relation to frozen, refrigerated and heated food and beverages, stationeries such as writing instruments and postcards, clothing, toys and the like. Heretofore, several materials or compositions were known as reversible thermochromic material such as (1) materials utilizing a crystal of a metal complex, (2) materials utilizing a cholesteric liquid crystal, (3) compositions having as three constituents thereof an electron donative color former, a chemical compound having a phenolic hydroxyl radical and a chemical compound having an alcoholic hydroxyl radical, (U.S. Pat. No. 2324671, U.S. Pat. No. 3560229, U.S. Pat. No. 4028118), (4) compositions having as three constituents thereof a chemical compound which belongs to the class of phthaleins or floresceines, an electron donative organic nitrogen compound, and a chemical cosmpound selected from alcohols or amides (Japanese Patent Laid-open No. 65772/1982), and (5) compositions containing a polyhydroxy compound, an alkali metal salt of boric acid and a pH indicator.

Of these reversible thermochromic materials, (1) the one using a crystal of metal complex is superior in heat resistant and light resistant properties and is partly utilized for industrial use, but its metachromatizing temperature is higher than room temperature and it further has the defect that its chromic hue is limited. (2) Cholesteric liquid crystals are used for thermometers, ornaments and daily necessaries, but its metachromatizing temperature cannot be freely selected and also it is expensive and has the defect that its metachromatism life is short. (3) The combination of an electron donative color former and 2,2-bis-(4-hydroxyphenyl) propane (hereafter called bis-phenol A) is widely used in stationeries, toys, clothing and the like, but its usage is limited because of its poor light resistance, (4) a composition having as three constituents thereof, viz., a chemical compound of phthaleins or fluoresceines, an electron donative organic nitrogen compound and a chemical compound selected from alcohols or amides, has a limited chromic hue, and (5) the combination of a polyhydroxy compound, an alkali metal salt of boric acid and a pH indicator has the problem that its usage is limited because its metachromatism temperature is high and some time is required for it to chromically respond to temperature change.

SUMMARY OF THE INVENTION

An object of the present invention is to provide a reversible thermochromic material which lacks the above mentioned problems, has quick thermochromic response to change of temperature and intense coloring as well as superior solidity. As a result of various studies to achieve these objectives, the prevent inventors discovered that a remarkably efficient reversible thermochromic material is obtained by using as components an electron donative color former, a first kind of chemical compound, and a second chemical compound selected from alcohols, esters, ethers, ketones, carboxylic acids and acid amides, and thereby completed the present invention.

The reversible thermochromic material of this invention comprises the following components (a) an electron donative color former, (b) at least one chemical compound of general formula (I):

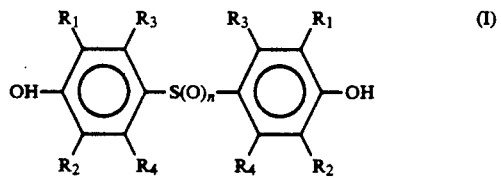

wherein, $R_1$ and $R_2$ represent either hydrogen atom, alkyl radical of $C_1$-$C_3$ or halogenated alkyl radical of $C_1$-$C_3$, hydroxyl radical, cycloalkyl radical or phenyl radical, with the proviso that if one of $R_1$ and $R_2$ is either a cyclohexyl or a phenyl radical, then the other is a hydrogen atom; $R_3$ and $R_4$ represent either a hydrogen atom, an alkyl radical of $C_1$-$C_{15}$, a halogenated alkyl radical of $C_1$-$C_{15}$, an hydroxy radical, a cyclohexyl radical or phenyl radical, with that of $R_1$-$R_4$ can be mutually identical or different but all of $R_1$-$R_4$ can not simultaneously be hydrogen atoms; n represents the integral number of 0, 1 or 2; or of general Formula (II)

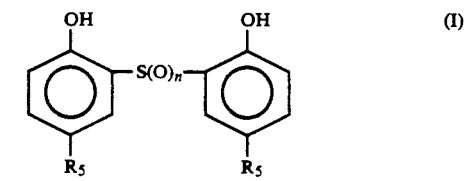

where the groups, which can be the same or different $R_5$ an alkyl radical of $C_1$-$C_{12}$, a cycloalkyl radical of $C_3$-$C_{10}$, an aralkyl radical of $C_7$-$C_{10}$ or a phenyl radical or, and n is the integer 0, 1 or 2; and (c) at least one compound selected from the group consisting of alcohols, esters, ethers, ketones, carboxylic acids and acid amides.

The reversible thermochromic composition of the present invention can be used directly or enclosed in a micro-capsule to stabilize it and render it easy to handle.

In the present invention, by using the chemical compounds of general formulas (I) and (II), the problems of the past reversible thermochromic materials are solved by such as: (1) Chromatizing brightly and moreover very clearly. (2) Very sensitive in chromically, responding to changes of temperature. (3) Superior light resistance. (4) Efficient micro-capsulation is possible.

The micro-capsulated thermochromic materials can be applied to new uses in addition to the conventional uses of existing thermochromic materials became of their stable thermochromic property because they chromatize very brightly and in dense colors, because they change thermochromic hue (coloration - discoloration) within a narrow range of temperature and because they have a stable thermochromatism even after frequent recycling on a long term basis.

DETAILED DESCRIPTION OF THE INVENTION AND PREFERRED EMBODIMENTS

The color of the reversible thermochromic material of the present invention can be selected by the choice electron donative color former (a) (hereinafter referred to as color former), chromatize with a compound (b) represented by general formula (I) or (II) and the metachromic temperature determined the kind of compound (c) that is selected from alcohols, esters, ethers, ketones, carboxylic acids and acid amides. Selection of thermochromic material (a) becomes broad because the solubility of compound (b) in (c) is superior. Since the blending amount of (a) and (b) to (c) within a range that will not greatly influence the metachromic temperature can be increased, an improvement in the chromatic density and image can be expected. Also, because the solubility of the compound (b) in water is low, a known capsulation method can be used.

Examples of component (a) of the present invention are triphenylmethane compounds, fluoran compounds, phenothiazine compounds, indolylphthalido compounds, leuco auramine compounds, spiropyrane compounds, rhodamine lactum compounds, azaphthalide compounds, benzoxazine compounds and the like. For example, crystal violet lactone (hereinafter called CVL), 3-(4-diethylamino-2-ethoxyphenyl)-3-(1-ethyl-2-methylindol-3-il)-4-azaphthalido, 3-(p-dimethylaminophenyl)-3-(1,2-dimethylindol-3-il) phthalido, 3-(p-dimethylaminophenyl)-3-(2-methylindol-3-il) phthalido, 3-(p-dimethylaminophenyl)-3-(1,2-dimethylindol-3-il) phthalido, 3,3-bis-(1,2-dimethylindol-3-il)-5-dimethylaminophthalido, 3,3-bis-(1,2-dimethylindol-3-il)-6-dimethylaminophthalido, 3,3-bis-(9-ethylcarbazol-3-il)-6-dimethylaminophthalido, 3,3-bis-(2-phenylindol-3-il)-6-dimethylaminophthalido, 3-(4-diethylamino-2-ethoxyphenyl)-3-(1-ethyl-2-methylindol -3-il)-4-azaphthalido, 3-(4-diethylamino-2-ethoxyphenyl)-3-(1-octyl-2-methylindol-3-il) -4-azaphthalido, benzoyl leucomethylene blue, 3-methyl-spriro-dinaphthopyrane, 3-ethyl-spiro-dinaphthopyrane, 3-phenyl-spiro-dinaphthopyrane, 3-benzyl-spiro-dinaphtho-pyrane, 3-methylnaphtho-(6'-methoxybenzo)-spiropyrane, rhodamine-B-anilinolactum, 3-diethylamino-6- methyl-7- chlorofluoran, 3-diethylamino-5, 7-dimethylfluoran, 3-diethylamino-7-chlorofluoran, 3-diethylamino-7, 8-benzfluoran, 3-(cyclohexylamino)-7-methylfluoran, 3-diethyl-amino-6-chloro-7-anilinofluoran, 3-diethylamino-7-anilino- fluoran, 3-diethylamino-7-dibenzylaminofluoran, 3-diethyl-amino-7-o-chloroanilinofluoran, 3-dibutylamino-7-o-chloroanilinofluoran, 3-(N-ethyl-N-p-toluidino)-6-methyl-7-anilinofluoran, 3-diethylamino-6-methyl-7-anilinefluoran, 3-dibutylamino-6-methyl-7-anilinofluoran, 3-(N-methyl-N-cyclohexylamino)-6-methyl-7-anilinofluoran, 3-piperidino-6-methyl-7-anilinofluoran, 3-pyrrolidino-6-methyl-7-anilinofluoran, 3-diethylamino-7-(m-trifluoremethylanilino) fluoran, 3-(N-ethyl-N-isoamylamino)-6-methyl-7-anilinofluoran and the like can be listed.

The component (b) compounds of the present invention represented by the general formula (I) or (II) can be easily synthesized by the following methods. For example, bis-(substituted phenol) sulfides are obtained by treating substituted phenols and sulfur dichloride ($SCl_2$) in the presence of a catalyst, and bis-(substituted phenol) sulfoxides are obtained by oxidation of bis- (substituted phenol) sulfides with hydrogen peroxide. They can also be obtained by reacting substituted phenols with thionyl chloride ($SOCl_2$). Bis- (substituted phenol) sulfones can be obtained by oxidation of bis- (substituted phenol) sulfides or bis - (substituted phenyl) sulfoxides with hydrogen peroxide. They can also be obtained by reacting substituted phenols with sulfuryl chloride ($SO_2Cl_2$). Illustrative examples are: bis-(4-hydroxy-3-methylphenyl) sulfide, bis-(4-hydroxy-3-ethylphenyl) sulfide, bis-(4-hydroxy-3-n-propylphenyl) sulfide, bis-(4-hydroxy-3-isopropylphenyl) sulfide, bis-(3,4-dihydroxyphenyl) sulfide, bis-(4-hydroxy-3-cyclohexylphenyl) sulfide, bis-(3-phenyl-4-hydroxyphenyl) sulfide, bis-(4-hydroxy-3-trifluoromethylphenyl) sulfide, bis-(4-hydroxy-3-trichloromethylphenyl) sulfide, bis-(4-hydroxy-3,5-dimethylphenyl) sulfide, bis-(4-hydroxy-2-ethylphenyl) sulfide, bis-(4-hydroxy-3-ethyl-5-methylphenyl) sulfide, bis-(4-hydroxy-2-methylphenyl) sulfide, bis-(4-hydroxy-2,6-dimethylphenyl) sulfide, bis-(4-hydroxy- 2-iso-propylphenyl) sulfide, bis-(4-hydroxy-2-tert-butyl-phenyl) sulfide, bis-(4-hydroxy-2-cyclohexylphenyl) sulfide, bis-(2-phenyl-4-hydroxyphenyl) sulfide, bis-(2,4-dihydroxyphenyl) sulfide, bis-(2,4,6-trihydroxyphenyl) sulfide, bis-(4-hyiroxy-2-trichloromethylphenyl) sulfide, bis-(2,4-di-hydroxyphenyl) sulfide, bis-(4-hydroxy-2,5-dimethylphenyl) sulfide, bis-(4-hydroxy-2-methyl-5-ethylphenyl) sulfide, bis-(4-hydroxy-2-methyl-5-isopropylphenyl) sulfide, bis-(4-hydroxy-2,3-dimethylphenyl) sulfide, bis-(4-hydroxy-2,5-diethylphenyl) sulfide, bis-(4-hydroxy-2,5-diisopropyl-phenyl) sulfide, bis-(4-hydroxy-2,3,6-trimethylphenyl) sulfide, bis-(2,4,5-trihydroxyphenyl) sulfide, bis-(4-hydroxy-2-cyclohexyl-5-methylphenyl) sulfide, bis-(4-hydroxy-2,5-ditrifloromethylphenyl) sulfide, bis-(2,3,4-trihydroxyphenyl) sulfide, bis-(2-butyl-4,5-dihydroxyphenyl) sulfide, bis-(4-hydroxy-2,5-diphenylphenyl) sulfide, bis-(4-hydroxy-octyl-5-methylphenyl) sulfide, bis-(4-hydroxy-3-methylphenyl) sulfoxide, bis-(4-hydroxy-3-n-propylphenyl) sulfoxide, bis-(4-hydroxy-3,4-dihydroxyphenyl) sulfoxide, bis-(4-hydroxy-3-cyclohexylphenyl) sulfoxide, bis-(3-phenyl-4-hydroxyphenyl) sulfoxide, bis-(4-hydroxy-3,5-dimethyl-phenyl) sulfoxide, bis-(4-hydroxy-2-methylphenyl) sulfoxide, bis-(4-hydroxy-2,6-dimethylphenyl) sulfoxide, bis-(4-hydroxy-2-tertbutylphenyl) sulfoxide, bis-(4-hydroxy-3-ethylphenyl) sulfoxide, bis-(4-hydroxy-3-isopropylphenyl) sulfoxide, bis-(4-hydroxy-3,4-dihydroxyphenyl) sulfoxide, bis-(4-hydroxy- 3-trichloromethylphenyl) sulfoxide, bis-(4-hydroxy-3-methyl-phenyl) sulfone, bis-(4-hydroxy-3-n-propylphenyl) sulfone, bis-(4-hydroxy-3,4-dihydroxyphenyl) sulfone, bis-(4-hydroxy- 3-cyclohexylphenyl) sulfone, bis-(3-phenyl-4-hydroxyphenyl) sulfone, bis-(4-hydroxy-3,5-diethylphenyl) sulfone, bis-(4-hydroxy-2-methylphenyl) sulfone, bis-(4-hydroxy-2,6-dimethylphenyl) sulfone, bis-(4-hydroxy-2-isopropylphenyl) sulfone, bis-(4-hydroxy-3-methylphenyl) sulfone, bis-(4-hydroxy-3-isopropylphenyl) sulfone, bis-(3,4-dihydroxyphenyl) sulfone, bis-(4-hydroxy-3-tri-chloromethylphenyl) sulfone, bis-(2-hydroxy-5-methylphenyl) sulfide, bis-(2-hydroxy-5-tert-butylphenyl) sulfide, bis-(2-hydroxy-5-tert-amylphenyl) sulfide, bis-(2-hydroxy-5-cyclohexylphenyl) sulfide, bis-(2-hydroxy-5-cumylphenyl) sulfide, bis-(2-hydroxy-5-tert-octylphenyl) sulfide, bis-(2-hydroxy-5-dodecylphenyl) sulfide, bis-(2-hydroxy-5-methylphenyl) sulfoxide, bis-(2-hydroxy-5-tert-butylphenyl) sulfoxide, bis-(2-hydroxy-5-tert-amylphenyl) sulfoxide, bis-(2-hydroxy-5-cumylphenyl) sulfoxide, bis-(5-phenyl-2-hydroxyphenyl) sulfoxide, bis-(2-hydroxy-5-tert-octylphenyl) sulfoxide, bis-(2-hydroxy-5-dodecylphenyl) sulfoxide, bis-(2-hydroxy-5-methylphenyl) sulfone, bis-(2-hydroxy-5-isopropylphenyl) sulfone, bis-(2-hydroxy-5-tert-butylphenyl) sulfone, bis-(2-hydroxy-5-tert-amylphenyl) sulfone, bis-(2-hydroxy-5-cyclohexylphenyl) sulfone, bis-(2-hydroxy-5-cumylphenyl) sulfone, bis-(2-hydroxy-5-phenylphenyl) sulfone, bis-(2-hydroxy-5-tert-octylphenyl) sulfone, bis-(2-hydroxy-5-dodecylphenyl) sulfone, and the like.

In the group of compounds represented by the general formula (I), the substituent on the ortho position of phenolic hydroxy radical influences on chromatic density and stability of chromatic image due to its steric hindrance.

In the general formula (I), $R_1$-$R_4$ is preferably hydrogen atom, alkyl radical of $C_1$-$C_3$, cyclohexyl or phenyl radical, and of these, hydrogen atom or an alkyl radical of $C_1$-$C_3$ is more preferable. In the general formula (II), $R_5$ is preferably alkyl radical of $C_1$-$C_{12}$, cyclohexyl radical or phenylalkyl radical, without substituent or with substituent of $C_7$-$C_{10}$, and of these, alkyl radical of $C_1$-$C_{12}$, cyclohexyl, benzyl or phenethyl is more preferable.

Also, adapting to a diversification of performance, the combined use of the chemical compounds shown in general formulas (I) and (II) with known compounds is possible. As known compounds, there are, for example, compounds having a phenolic hydroxyl radical and their salts, aromatic carboxylic acids and their salts, phosphoric acid esters and their salts, 1,2,3- triazole and their derivatives which are disclosed in Japanese Patent Laid-open No. 173028/1985.

Examples of the compounds of component (c) of the present invention are alcohols, esters, ethers, ketones, carboxylic acids and acid amides. The following is a list of such compounds.

Alcohols: These are from monohydric alcohols to polyhydric alcohols and their derivatives. Concretely, there are n-octyl alcohol, n-nonyl alcohol, n-decyl alcohol, n-lauryl alcohol, n-myristhyl alcohol, n-cetyl alcohol, n-stearyl alcohol, n-eicosyl alcohol, n-docosyl alcohol, n-melisyl alcohol, isocetyl alcohol, isostearly alcohol, isodocosyl alcohol, oleyl alcohol, cyclohexanol, cyclopentanol, benzyl alcohol, cinnamyl alcohol, ethylene glycol, diethylene glycol, triethylene glycol, polyethylene glycol, propylene glycol, butylene glycol, hexylene glycol, cyclohexane- 1,4- diol, trimethyrol propane, 1,2,6- hexane triol, penta- erythrite.

Esters: amyl acetate, octyl acetate, butyl proprionate, octyl proprionate, phenyl propionate, ethyl caproate, amyl caproate, ethyl caprylate, amyl caprylate, ethyl caprate, amyl caprate, octyl caprate, methyl laurate, ethyl laurate, butyl laurate, hexyl laurate, octyl laurate, dodecyl laurate, cetyl laurate, stearyl laurate, methyl myristate, ethyl myristate, butyl myristate, hexyl myristate, octyl myristate, lauryl myristate, myristyl myristate, cetyl myristate, stearyl myristate, methyl palmitate, ethyl palmitate, butyl palmitate, hexyl palmitate, octyl palmitate, lauryl palmitate, myristyl palmitate, cetyl palmitate, stearyl palmitate, methyl stearate, ethyl stearate, butyl stearate, hexyl stearate, octyl stearate, lauryl stearate, myristyl stearate, cetyl stearate, stearyl stearate, methyl behenate, ethyl behenate, propyl behenate, butyl behenate, ethyl benzoate, buty benzoate, amyl benzoate, phenyl benzoate, ethyl acetoacetate, methyl oleate, butyl oleate, butyl acrylate, diethyl oxalate, dibutyl oxalate, dimethyl malonate, diethyl malonate, dibutyl malonate, dibutyl tartrate, dimethyl cebacate, dibutyl cebacate, dimethyl phthalate, dibutyl phthalate, dioctyl phthalate, dibutyl fumarate, diethyl malonate, triethyl citrate, 12- hydroxy stearic acid triglyceride, castor oil, 12- hydroxy stearic acid methyl ester, dioxystearic acid methyl ester.

Ethers: diethylene glycol dimethyl ether, diphenyl ether, distearyl ether, butyl ether, hexyl ether, diisopropyl benzyl ether, ethylene glycol dibutyl ether, diethylene glycol dibutyl ether, ethylene glycol diethyl ether, ethylene glycol diphenyl ether, ethylene glycol monophenyl ether.

Ketones: diphenyl ketone, distearyl ketone, diethyl ketone, ethyl butyl ketone, methyl hexyl ketone, mesityl oxide, cyclohexanone, propiophenone, benzphenone, 2,4-pentandione, acetonyl acetone, diacetone alcohol, ketone wax.

Carboxylic acids: caproic acid, caprylic acid, capric acid, lauric acid, myristic acid, palmitic acid, stearic acid, arachidic acid, behenic acid, lignoceric acid, cerotic acid, palmitoleic acid, oleic acid, ricinoleic acid, linoleic acid, linolenic acid, eleostearic acid, erucic acid etc.

Acid amides: capryl amide, capric amide, lauryl amide, myristyl amide, palmityl amide, stearo amide, beheno amide, oleino amide, benzamido.

The above mentioned compounds can be used alone, or can be used in combinations of two or more in order to obtain any desired melting point.

The weight ratio of each component in the reversible thermochromic materials is generally (a):(b):(c)=1:0.1-100: 10-1000, with the range of (a):(b):(c)=1:0.1-50:10-100 being more preferable.

The reversible thermochromic materials of the present invention can, as needed, be used together with compounds other than the above mentioned constituents such as dyes, pigments, anti- oxidants, UV absorbents which do not have metachromatic property, to the extent they do not harm metachromic performance.

The reversible thermochromic materials can be prepared by mixing (a) color formers, (b) compounds shown in general formulas (I) and (II), and (c) compounds and heating and dissolving the mixture. However, the reversible thermochromic materials made by the above mentioned constituents are easily affected chemically and their coloration-discoloration temperature is affected by the external environment. For this reason, in order to protect the original function of the materials and enhance their usage in various fields, and with the object of making it possible to use various materials which differ in the thermochromic hue and metachromic temperature under the same conditions, a method of enclosing the reversible thermochromic materials of the present invention in a micro-capsule can be adopted.

The micro-capsule containing the reversible thermochromic materials in the present invention can be manufactured by any known method. For example, the micro-capsule solution can be prepared by the coacervation method using gelatin, the interfacial polymerization method, the in-situ polymerization method, the in-liquid vulcanization method, and the like.

The micro-capsule liquid containing the reversible thermochromic material can be used as is as an aqueous ink, or as a water base paint. The micro capsule can be used in the form of the solid obtained by filtration, centrifugal separation, and drying of the micro-capsule liquid. The solid micro-capsule can be used as a heat sensor and display apparatus in industrial fields by fusing in a resin and then processing into films, pellets, filaments adhering to fibers, printing as oil based ink on papers, films, ceramics, glasses, fibers through such methods, for example, as silk-screening, photogravure, off-set and flexography.

EXAMPLES

The method of the present invention is explained in detail by the following examples, but the present invention is not to be limited by the examples. Example 1.

An inner phase was prepared by mixing three components of (a), (b) and (c) below followed by heating the mixture to dissolve them.

Component (a) : CVL 2.0 g.
Component (b) : bis- (4- hydroxy- 3- methylphenyl) sulfide 2.0 g.
Component (c) : stearyl alcohol 46.0 g.

By using the inner phase, a micro-capsule liquid was produced by the following micro-capsulation method (A). 10 g of 10% by weight of polyvinyl alcohol (Kuraray "117") was added to 50 g of this micro-capsule solution and then the mixture was blended and stirred. A reversible thermochromic sheet was obtained by coating this mixture on a sheet of paper to give a dry coat weight of 8 g/m$^2$ and drying it.

This reversible thermochromic sheet was heated or cooled and the metachromic temperature (the temperature of the change from coloration to discoloration) and hue were measured. The results are shown on Table 1.

EXAMPLES 2-77

Inner phases were prepared in the similar manner to Example 1. except for replacing the combination of components (a), (b) and (c) by that shown on Table 1. By using each inner phase obtained, a micro-capsule liquid was produced by one of the micro-capsulation methods described below. By using the micro-capsule solution, a reversible thermochromic sheet was obtained in the same way as in Example 1. The reversible thermochromic sheet was heated or cooled and the metachromic temperature (the temperature at which the color changes from colored to colorless) and hue were measured. The results are shown on Table 1.

The chromic densities of some sheets were measured by using Macbeth densitometer with various filters. Consequently, the density differs depending on the hue. The greater the number, the higher the density indicated. The reversible thermochromic sheet was exposed to light on a carbon arc fadeometer (Suga Test Instruments) for one hour and then the density was measured by using Macbeth densitometer and compared to the pre-tested sheet. The results are shown in terms of residual rate (%) on Table 2. The greater the value, the less the fading by the light.

Micro-capsulation Method (A)

25 g of a 10% by weight of aqueous solution of ethylene maleic anhydride copolymer (Monsanto "EMA-31") was mixed with 60 g of water. The pH of the mixture was adjusted to 4.0 with a 10% by weight of aqueous NaOH solution. The mixture was maintained at 60° C. to emulsify 50 g of the above mentioned inner phase in a homogenizer. 15 g of a methylated methyrol melamine aqueous solution (Mitsui Toatsu Chemicals Inc. "U-ramin T-33") containing 80% by weight of solid was added to the mixture to obtain a micro-capsule solution with an average particle diameter of 10 μm by stirring for two hours at 70° C.

Micro-capsulation Method (B)

50 g of an inner phase, 9 g of acrylonitrile, 1 g of acrylamide, 0.1 g of methylene- bis- acrylamide and 0.2 g of azo- bis- isobutyronitrile were uniformly dissolved. After emulsifying the solution in 100 g of a 5% by weight of polyvinyl alcohol warmed to 60° C. by using a homo-mixer, the emulsion was kept for three hours at 70° C. to obtain a micro-capsule solution with an average particle diameter of 10 μm.

Micro-capsulation Method (C)

50 g of an inner phase and 5 g of terephthalic dichloride were uniformly dissolved. After emulsifying this solution in 100 g of a 5% by weight of polyvinyl alcohol (Kuraray "117") warmed at 60° C. by using a homo-mixer, 5 g of 1,6-hexamethylene diamine was added to the emulsion, followed by keeping for three hours at 70° C. to obtain a micro-capsule solution with an average particle diameter of 10 μm.

Micro-capsulation Method (D)

50 g of an inner phase and 5 g of hexamethylene diisocyanate trimer with isocyanurate ring (Colonate EH, Nippon Polyurethane Industry Co.,) were uniformly dissolved. After emulsifying the solution in 100 g of a 5% by weight of polyvinyl alcohol (Kuraray "117") warmed at 60° C. by using a homogenizer, 1 g of diethylene triamine was added to the enulsion followed by keeping for three hours at 70° C. to obtain a micro-capsule solution with an average particle diameter of 10 μm.

COMPARATIVE EXAMPLES 1-5

The components (b) and (c) shown in Comparative Examples 1-5 on Table 1 were used in place of bis- (4-hydroxy- 3- methylphenyl) sulfide and a reversible thermochromic sheet was prepared in the same way as in Example 1, and tested. The results are shown in Tables 1 and 2.

COMPARATIVE EXAMPLES 6-9

A reversible thermochromic sheet was prepared in the same way as in Example 1 except for replacing the bis- (4-hydroxy- 3- methyl phenyl) sulfide with bis-phenol A, and replacing the CVL with Red-3 (Comparative Example 6), PSD-V (Comparative Example 7), Green DCF (Comparative Example 8), and PSD-150 (Comparative Example 9), and tested. A partial precipitation of crystal was observed in the micro-capsule liquid. This is believed to be caused by insufficient solubility of bis- phenol A in cetyl alcohol. The results are shown on Tables 1 and 2.

As shown in Table 1, for a micro-capsulated reversible thermochromic material of the present invention, the various micro-capsulation methods such as the in-situ method, the interfacial polymerization method, etc, can be used, and the resulting thermochromic sheet will have a broad temperature range and many chromatic color hues.

As shown in the comparative examples on Table 2, chemical compounds without substituted radicals such as bis- (4- hydroxyphenyl) sulfide (Comparative Example 1), bis- (4- hydroxyphenyl) sulfone (Comparative Example 3), bis- (2- hydroxyphenyl) sulfide (Comparative Example 4), etc., are very highly soluble in water, therefore the micro-capsulation rate is inadequate and the obtained metachromic sheet is inferior in metachromic density and light resistance compared with Examples 1-29.

Bis- (4- hydroxy- tert- butyl- 6- methylphenyl) sulfide (Comparative Example 2) was inferior in both metachromic density and anti-light property, perhaps due to steric hindrance by tert- butyl radical attached to hydroxyl phenol moiety.

In comparing bis-phenol A with the compounds in the present invention, in case they are combined with a color former having a weak light resistance such as CVL, there is clearly a difference in their light resistances (compared Examples 1-29 with comparative Example 5).

As shown in Comparative Examples 6-9, a combination with a color former (Red -3, PSD-V, Green DCF, PSD-150) having inferior solubility in (c) constituent with bisphenol A, show partial precipitation at the time of micro-capsulation and will not reach complete micro-capsulation. Consequently, a Thermochromic sheet prepared gave lower color density and was inferior in light resitance (Comparison between Example 39 and comparative Example 6, Example 48 and Example 7, Example 57 and comparative Example 8, Example 63 and comparative Example 9).

TABLE 1

| Number | Component (a) | Component (b) | Component (c) | Thermochromic temp. and hue | C.M. |
| --- | --- | --- | --- | --- | --- |
| Example | | | | | |
| 1 | CVL | Bis-(4-hydroxy-3-methylphenyl) sulfide | Stearyl alcohol | Blue $\xrightarrow{53°C}$ Colorless | (A) |
| 2 | CVL | Bis-(4-hydroxy-3-methylphenyl) sulfide | Stearic acid | Blue $\xrightarrow{62°C}$ Colorless | (A) |
| 3 | CVL | Bis-(4-hydroxy-3-n-propylphenyl) sulfide | Oleylamide | Blue $\xrightarrow{65°C}$ Colorless | (A) |
| 4 | CVL | Bis-(4-hydroxy-3-n-propylphenyl) sulfide | Cethyl alcohol | Blue $\xrightarrow{43°C}$ Colorless | (A) |
| 5 | CVL | Bis-(3-phenyl-4-hydroxyphenyl) sulfide | Cethyl alcohol | Blue $\xrightarrow{43°C}$ Colorless | (A) |
| 6 | CVL | Bis-(3-phenyl-4-hydroxyphenyl) sulfide | Lauric acid | Blue $\xrightarrow{36°C}$ Colorless | (A) |
| 7 | CVL | Bis-(4-hydroxy-3-cyclohexylphenyl) sulfide | Myristyl alcohol | Blue $\xrightarrow{33°C}$ Colorless | (A) |
| 8 | CVL | Bis-(4-hydroxy-3-cyclohexylphenyl) sulfide | Methyl palmitate | Blue $\xrightarrow{26°C}$ Colorless | (A) |
| 9 | CVL | Bis-(4-hydroxy-3-n-propylphenyl) sulfoxide | Cethyl alcohol | Blue $\xrightarrow{41°C}$ Colorless | (A) |
| 10 | CVL | Bis-(4-hydroxy-3-n-propylphenyl) sulfoxide | Methyl palmitate | Blue $\xrightarrow{24°C}$ Colorless | (A) |
| 11 | CVL | Bis-(4-hydroxy-3-cyclohexylphenyl) sulfone | Cethyl alcohol | Blue $\xrightarrow{42°C}$ Colorless | (A) |
| 12 | CVL | Bis-(4-hydroxy-3-cyclohexylphenyl) sulfone | Methyl palmitate | Blue $\xrightarrow{25°C}$ Colorless | (A) |
| 13 | CVL | Bis-(2-hydroxy-5-methylphenyl) sulfide | Cethyl alcohol | Blue $\xrightarrow{43°C}$ Colorless | (A) |
| 14 | CVL | Bis-(2-hydroxy-5-methylphenyl) sulfide | Methyl palmitate | Blue $\xrightarrow{24°C}$ Colorless | (A) |
| 15 | CVL | Bis-(2-hydroxy-5-methylphenyl) sulfoxide | Cethyl alcohol | Blue $\xrightarrow{40°C}$ Colorless | (A) |
| 16 | CVL | Bis-(2-hydroxy-5-methylphenyl) sulfoxide | Methyl palmitate | Blue $\xrightarrow{23°C}$ Colorless | (A) |
| 17 | CVL | Bis-(2-hydroxy-5-tert-butylphenyl) sulfone | Myristyl alcohol | Blue $\xrightarrow{32°C}$ Colorless | (A) |
| 18 | CVL | Bis-(2-hydroxy-5-tert-butylphenyl) sulfone | Methyl palmitate | Blue $\xrightarrow{24°C}$ Colorless | (A) |
| 19 | CVL | Bis-(4-hydroxy-2-methylphenyl) sulfide | Lauryl alcohol | Blue $\xrightarrow{19°C}$ Colorless | (A) |
| 20 | CVL | Bis-(4-hydroxy-2-methylphenyl) sulfide | Methyl myristate | Blue $\xrightarrow{12°C}$ Colorless | (A) |
| 21 | CVL | Bis-(5-phenyl-2-hydroxyphenyl) sulfide | Myristyl alcohol | Blue $\xrightarrow{32°C}$ Colorless | (A) |

TABLE 1-continued

| Number | Component (a) | Component (b) | Component (c) | Thermochromic temp. and hue | C.M. |
|---|---|---|---|---|---|
| 22 | CVL | Bis-(5-phenyl-2-hydroxyphenyl) sulfide | Methyl laurate | Blue —0° C.→ Colorless | (A) |
| 23 | CVL | Bis-(4-hydroxy-3,5-dimethylphenyl) sulfide | n-butyl laurate | Blue —−11° C.→ Colorless | (A) |
| 24 | CVL | Bis-(4-hydroxy-3,5-dimethylphenyl) sulfide | Heptyl caprylate | Blue —−17° C.→ Colorless | (A) |
| 25 | CVL | Bis-(4-hydroxy-2,5-dimethylphenyl) sulfide | Ethyl n-undecenoate | Blue —−23° C.→ Colorless | (A) |
| 26 | CVL | Bis-(4-hydroxy-2,5-dimethylphenyl) sulfide | Ethyl caprylate | Blue —−26° C.→ Colorless | (A) |
| 27 | CVL | Bis-(4-hydroxy-2-metyl-5-n-propylphenyl) sulfide | Ethyl caprylate | Blue —−40° C.→ Colorless | (A) |
| 28 | CVL | Bis-(4-hydroxy-3-methylphenyl) sulfide | Lauric amide<br>Stearyl alcohol (10) | Blue —80° C.→ Colorless | (A) |
| 29 | CVL | Bis-(2,4-dihydroxyphenyl) sulfide | Cethyl alcohol (90)<br>Myristyl alcohol (10) | Blue —37° C.→ Colorless | (A) |
| 30 | CVL | Bis-(4-hydroxy-3-cyclohexylphenyl) sulfide | Methyl palmitate (90)<br>Methyl myristate (10) | Blue —19° C.→ Colorless | (A) |
| 31 | CVL | Bis-(3-phenyl-4-hydroxyphenyl) sulfone | Ethyl myristate (90)<br>n-butyl myristate (10) | Blue —2° C.→ Colorless | (A) |
| 32 | CVL | Bis-(4-hydroxy-3-methylphenyl) sulfoxide | Methyl laurate (90)<br>Methyl myristate (10) | Blue —−6° C.→ Colorless | (A) |
| 33 | Blue-63 | Bis-(4-hydroxy-2-methylphenyl) sulfide | Stearyl alcohol | Blue —52° C.→ Colorless | (A) |
| 34 | Blue-63 | Bis-(4-hydroxy-2-methylphenyl) sulfide | Cethyl alcohol | Blue —45° C.→ Colorless | (A) |
| 35 | Blue-63 | Bis-(4-hydroxy-2-methylphenyl) sulfide | Myristyl alcohol | Blue —34° C.→ Colorless | (A) |
| 36 | Blue-63 | Bis-(3-phenyl-4-hydroxyphenyl) sulfone | Methyl palmitate | Blue —26° C.→ Colorless | (A) |
| 37 | Blue-63 | Bis-(3-phenyl-4-hydroxyphenyl) sulfone | Lauryl alcohol | Blue —20° C.→ Colorless | (A) |
| 38 | Blue-63 | Bis-(3-phenyl-4-hydroxyphenyl) sulfone | Methyl myristate | Blue —9° C.→ Colorless | (A) |
| 39 | Red-3 | Bis-(4-hydroxy-3-methylphenyl) sulfide | Cethyl alcohol | Pink —45° C.→ Colorless | (A) |
| 40 | Red-3 | Bis-(4-hydroxy-3-methylphenyl) sulfide | Myisthyl alchohol | Pink —34° C.→ Colorless | (A) |
| 41 | Red-3 | Bis-(4-hydroxy-3-methylphenyl) sulfide | Ethyl myristate | Pink —7° C.→ Colorless | (A) |
| 42 | Indolyl red | Bis-(4-hydroxy-2-cyclohexylphenyl) sulfide | Stearyl alcohol | Red —50° C.→ Colorless | (A) |
| 43 | Indolyl red | Bis-(4-hydroxy-2-cyclohexylphenyl) sulfide | Cethyl alcohol | Red —43° C.→ Colorless | (A) |
| 44 | Indolyl red | Bis-(4-hydroxy-2-cyclohexylphenyl) sulfide | Methyl palmitate | Red —23° C.→ Colorless | (A) |
| 45 | Indolyl red | Bis-(4-hydroxy-2,6-dimethylphenyl) sulfoxide | Methyl laurate | Red —1° C.→ Colorless | (A) |
| 46 | Indolyl red | Bis-(4-hydroxy-2,6-dimethylphenyl) sulfoxide | n-butyl laurate | Red —−10° C.→ Colorless | (A) |
| 47 | Indolyl red | Bis-(4-hydroxy-2,6-dimethylphenyl) sulfoxide | Ethyl myristate | Red —5° C.→ Colorless | (A) |
| 48 | PSD-V | Bis-(2-hydroxy-5-isopropylphenyl) sulfone | Cethyl alcohol | Vermili —44° C.→ Colorless | (A) |

TABLE 1-continued

| Number | Component (a) | Component (b) | Component (c) | Thermochromic temp. and hue | C.M. |
|---|---|---|---|---|---|
| 49 | PSD-V | Bis-(2-hydroxy-5-isopropylphenyl) sulfone | Lauryl alcohol | Vermili $\xrightarrow{20° C.}$ Colorless | (A) |
| 50 | PSD-V | Bis-(2-hydroxy-5-isopropylphenyl) sulfone | Methyl myristate | Vermili $\xrightarrow{10° C.}$ Colorless | (A) |
| 51 | Y-1 | Bis-(2-hydroxy-5-methylphenyl) sulfide | Methyl stearate | Yellow $\xrightarrow{30° C.}$ Colorless | (A) |
| 52 | Y-1 | Bis-(2-hydroxy-5-methylphenyl) sulfide | Lauryl alcohol | Yellow $\xrightarrow{16° C.}$ Colorless | (A) |
| 53 | Y-1 | Bis-(2-hydroxy-5-methylphenyl) sulfide | Heptyl caprylate | Yellow $\xrightarrow{-20° C.}$ Colorless | (A) |
| 54 | Orange DCF | Bis-(2-hydroxy-5-methylphenyl) sulfone | Cethyl alcohol | Orange $\xrightarrow{42° C.}$ Colorless | (A) |
| 55 | Orange DCF | Bis-(2-hydroxy-5-methylphenyl) sulfone | Myristyl alcohol | Orange $\xrightarrow{19° C.}$ Colorless | (A) |
| 56 | Orange DCF | Bis-(3,4-dihydroxyphenyl) sulfone | Methyl laurate | Orange $\xrightarrow{-1° C.}$ Colorless | (A) |
| 57 | Green DCF | Bis-(4-hydroxy-2,5-dimethylphenyl) sulfide | Cethyl alcohol | Green $\xrightarrow{43° C.}$ Colorless | (A) |
| 58 | Green DCF | Bis-(4-hydroxy-3-methylphenyl) sulfide | Lauryl alcohol | Green $\xrightarrow{19° C.}$ Colorless | (A) |
| 59 | Green DCF | Bis-(4-hydroxy-3-methylphenyl) sulfide | Methyl laurate | Green $\xrightarrow{0° C.}$ Colorless | (A) |
| 60 | Black-15 | Bis-(2-hydroxy-5-tert-octylphenyl) sulfide | Cethyl alcohol | Black $\xrightarrow{43° C.}$ Colorless | (A) |
| 61 | Black-15 | Bis-(2-hydroxy-5-tert-octylphenyl) sulfide | Lauryl alcohol | Black $\xrightarrow{19° C.}$ Colorless | (A) |
| 62 | Black-15 | Bis-(2-hydroxy-5-tert-octylphenyl) sulfide | Heptyl caprylate | Black $\xrightarrow{-17° C.}$ Colorless | (A) |
| 63 | PSD-150 | Bis-(4-hydroxy-3-methylphenyl) sulfone | Myristyl alchohol | Black $\xrightarrow{35° C.}$ Colorless | (A) |
| 64 | PSD-150 | Bis-(4-hydroxy-3-methylphenyl) sulfone | Methyl laurate | Black $\xrightarrow{1° C.}$ Colorless | (A) |
| 65 | PSD-150 | Bis-(4-hydroxy-3-methylphenyl) sulfone | Heptyl caprylate | Black $\xrightarrow{-15° C.}$ Colorless | (A) |
| 66 | PSD-184 | Bis-(4-hydroxy-2-methylphenyl) sulfone | Cethyl alcohol | Black $\xrightarrow{44° C.}$ Colorless | (A) |
| 67 | PSD-184 | Bis-(4-hydroxy-2-methylphenyl) sulfone | Lauryl alcohol | Black $\xrightarrow{20° C.}$ Colorless | (A) |
| 68 | PSD-184 | Bis-(4-hydroxy-2-trichloromethylphenyl) sulfone | Methyl laurate | Black $\xrightarrow{1° C.}$ Colorless | (A) |
| 69 | CVL | Bis-(4-hydroxy-3-methylphenyl) sulfide | Lauryl alcohol | Blue $\xrightarrow{18° C.}$ Colorless | (B) |
| 70 | CVL | Bis-(4-hydroxy-3-methylphenyl) sulfide | Ethyl myristate | Blue $\xrightarrow{5° C.}$ Colorless | (B) |
| 71 | CVL | Bis-(4-hydroxy-3-methylphenyl) sulfide | Heptyl caprylate | Blue $\xrightarrow{-19° C.}$ Colorless | (B) |
| 72 | CVL | Bis-(4-hydroxy-3-methylphenyl) sulfide | Lauryl alcohol | Blue $\xrightarrow{15° C.}$ Colorless | (C) |
| 73 | CVL | Bis-(4-hydroxy-3-methylphenyl) sulfide | Ethyl myristate | Blue $\xrightarrow{3° C.}$ Colorless | (C) |
| 74 | CVL | Bis-(4-hydroxy-3-methylphenyl) sulfide | Heptyl caprylate | Blue $\xrightarrow{-20° C.}$ Colorless | (C) |

TABLE 1-continued

| Number | Component (a) | Component (b) | Component (c) | Thermochromic temp. and hue | C.M. |
|---|---|---|---|---|---|
| 75 | CVL | Bis-(4-hydroxy-3-methylphenyl) sulfide | Stearyl alcohol | Blue $\xrightarrow{49° C.}$ Colorless | (D) |
| 76 | CVL | Bis-(4-hydroxy-3-methylphenyl) sulfide | Myristyl alcohol | Blue $\xrightarrow{30° C.}$ Colorless | (D) |
| 77 | CVL | Bis-(4-hydroxy-3-methylphenyl) sulfide | Ethyl myristate | Blue $\xrightarrow{3° C.}$ Colorless | (D) |
| Comparison | | | | | |
| 1 | CVL | Bis-(4-hydroxyphenyl) sulfide | Cethyl alcohol | Blue $\xrightarrow{38° C.}$ Colorless | (A) |
| 2 | CVL | Bis-(4-hydroxy-3-tert-butyl-6-methylphenyl) sulfide | Cethyl alcohol | Blue $\xrightarrow{40° C.}$ Colorless | (A) |
| 3 | CVL | Bis-(4-hydroxyphenyl) sulfone | Cethyl alcohol | Blue $\xrightarrow{37° C.}$ Colorless | (A) |
| 4 | CVL | Bis-(2-hydroxyphenyl) sulfide | Cethyl alcohol | Blue $\xrightarrow{37° C.}$ Colorless | (A) |
| 5 | CVL | Bisphenol A | Cethyl alcohol | Blue $\xrightarrow{43° C.}$ Colorless | (A) |
| 6 | Red-3 | Bisphenol A | Cethyl alcohol | Red $\xrightarrow{40° C.}$ Colorless | (A) |
| 7 | PSD-V | Bisphenol A | Cethyl alcohol | Vermilion $\xrightarrow{40° C.}$ Colorless | (A) |
| 8 | Green DCF | Bisphenol A | Cethyl alcohol | Green $\xrightarrow{40° C.}$ Colorless | (A) |
| 9 | PSD-150 | Bisphenol A | Cethyl alcohol | Black $\xrightarrow{42° C.}$ Colorless | (A) |

CVL: Crystal violet lactone of phthalides, Yamamote Chem. Co., LTD.
Red-3: Fluoran compound, Yamamoto Chem. Co., LTD.
PSD-V: Fluoran compound, Nippon Soda Chem. Co., LTD.
C.M.: Capsulation method
CVL: Crystal violet lactone of phthalides, Yamamote Chem. Co., LTD.
Blue-63: Azaphthalide compound, Yamamoto Chem. Co., LTD.
Indolyl red: Phthalide compound, Yamamoto Chem. Co., LTD.
Y-1: Fluoran compound, Hodogaya Chemical Co., LTD.
Orange DFC: Fluoran compound, Hodogaya Chemical Co., LTD.
Green DCF: Fluoran compound, Hodogaya Chem. Co., LTD.
Black-15: Fluoran compound, Yamamoto Chem. Co., LTD.
PSD-150: Fluoran compound, Nippon Soda Chem. Co., LTD.
PSD-184: Fluoran compound, Nippon Soda Chem. Co., LTD.

TABLE 2

| Number | Component (a) | Component (b) | Component (c) | Hue produced and color density | Residual rate (%) |
|---|---|---|---|---|---|
| Example | | | | | |
| 1 | CVL | Bis-(4-hydroxy-3-methylphenyl) sulfide | Stearyl alcohol | Blue 1.05 | 43.8 |
| 4 | CVL | Bis-(4-hydroxy-3-n-propylphenyl) sulfide | Cethyl alcohol | Blue 1.07 | 44.9 |
| 5 | CVL | Bis-(3-phenyl-4-hydroxyphenyl) sulfide | Cethyl alcohol | Blue 1.04 | 41.3 |
| 7 | CVL | Bis-(4-hydroxy-3-cyclohexylphenyl) sulfide | Myristyl alcohol | Blue 1.05 | 41.9 |
| 9 | CVL | Bis-(4-hydroxy-3-n-propylphenyl) sulfoxide | Cethyl alcohol | Blue 1.02 | 40.2 |
| 11 | CVL | Bis-(4-hydroxy-3-cyclohexylphenyl) sulfone | Cethyl alcohol | Blue 1.03 | 41.7 |
| 13 | CVL | Bis-(2-hydroxy-5-methylphenyl) sulfide | Cethyl alcohol | Blue 1.06 | 42.5 |
| 15 | CVL | Bis-(2-hydroxy-5-methylphenyl) sulfoxide | Cethyl alcohol | Blue 1.03 | 42.7 |
| 17 | CVL | Bis-(2-hydroxy-5-tert-butylphenyl) sulfone | Myristyl alcohol | Blue 1.10 | 44.5 |
| 19 | CVL | Bis-(4-hydroxy-2-methylphenyl) sulfide | Lauryl alcohol | Blue 1.06 | 41.5 |
| 29 | CVL | Bis-(2,4-dihydroxyphenyl) sulfide | Cethyl alcohol (90) Myristyl alcohol (10) | Blue 1.01 | 39.9 |
| 39 | Red-3 | Bis-(4-hydroxy-3-methylphenyl) sulfide | Myristyl alcohol | Red 1.46 | 84.9 |

TABLE 2-continued

| | Component (a) | Component (b) | Component (c) | color density | rate (%) |
|---|---|---|---|---|---|
| 48 | PSD-V | Bis-(2-hydroxy-5-isopropylphenyl) sulfone | Cethyl alcohol | Vermilion 1.32 | 84.8 |
| 57 | Green DCF | Bis-(4-hydroxy-2,5-dimethylphenyl) sulfide | Cethyl alcohol | Green 1.10 | 80.0 |
| 63 | PSD-150 | Bis-(4-hydroxy-3-methylphenyl) sulfone | Myristyl alchohol | Black 1.26 | 92.1 |

CVL: Crystal violet lactone of phthalides, Yamamote Chem. Co., LTD.
Red-3: Fluorene compound, Yamamoto Chem. Co., Ltd.
PSD-V: Fluoran compound, Nippon Soda Chem. Co., Ltd.

| Number | Component (a) | Component (b) | Component (c) | color density | rate (%) |
|---|---|---|---|---|---|
| Comparison | | | | | |
| 1 | CVL | Bis-(4-hydroxyphenyl) sulfide | Cethyl alcohol | Blue 0.52 | 92.1 |
| 2 | CVL | Bis-(4-hydroxy-3-tert-butyl-6-metylphenyl) sulfide | Cethyl alcohol | Blue 0.56 | 5.8 |
| 3 | CVL | Bis-(4-hydroxyphenyl) sulfone | Cethyl alcohol | Blue 0.49 | 10.7 |
| 4 | CVL | Bis-2-(hydroxyphenyl) sulfide | Cethyl alcohol | Blue 0.50 | 4.1 |
| 5 | CVL | Bisphenol A | Cethyl alcohol | Blue 0.85 | 32.3 |
| 6 | Red-3 | Bisphenol A | Cethyl alcohol | Red 0.91 | 68.1 |
| 7 | PSD-V | Bisphenol A | Cethyl alcohol | Vermilion 1.35 | 70.1 |
| 8 | Green DCF | Bisphenol A | Cethyl alcohol | Green 0.94 | 61.7 |
| 9 | PSD-150 | Bisphenol A | Cethyl alcohol | Black 0.88 | 71.6 |

CVL: Crystal violet lactone of phthalides, Yamamote Chem. Co., LTD.
Red-3: Fluoran compound, Yamamoto Chem. Co., Ltd.
PSD-V: Fluoran compound, Nippon Soda Chem. Co., Ltd.
PSD-150: Fluoran compound, Nippon Soda Chem. Co., Ltd.

We claim:

1. A microcapsule containing encapsulated therein a reversible thermochromic composition comprising:
   (a) an electron donative color former;
   (b) at least one chemical compound represented by the general formula (I) or (II):

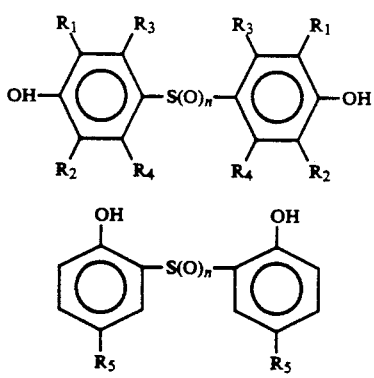

wherein $R_1$ and $R_2$ each represent either a hydrogen atom, $C_1$-$C_3$-alkyl, halogenated $C_1$-$C_3$-alkyl, hydroxyl, cyclohexyl or phenyl, with the proviso that if one of $R_1$ and $R_2$ is cyclohexyl or phenyl the other is a hydrogen atom; $R_3$ and $R_4$ each represent a hydrogen atom, $C_1$-$C_{15}$ alkyl, halogenated $C_1$-$C_{15}$ alkyl, hydroxyl, cyclohexyl or phenyl, with the proviso that at least one of $R_1$-$R_4$ is not a hydrogen atom; $R_5$ represents $C_1$-$C_{12}$ alkyl, $C_3$-$C_{10}$-cycloalkyl, $C_7$-$C_{10}$ aralkyl or phenyl; and n is the number 0, 1 or 2; and (c) at least one chemical compound selected from the group consisting of alcohols, esters, ethers, ketones, carboxylic acids and acid amides.

2. The microcapsule as claimed in claim 1, wherein n is 0.

3. The microcapsule as claimed in claim 1, wherein n is 1.

4. The microcapsule as claimed in claim 1, wherein n is 2.

5. The microcapsule as claimed in claim 1, wherein component (b) is at least one chemical compound represented by general formula (I) in which $R_1$, $R_2$, $R_3$ and $R_4$ each represent a hydrogen atom, $C_1$-$C_3$ alkyl, cyclohexyl or phenyl, with the proviso that at least one of $R_1$-$R_4$ is not a hydrogen atom.

6. The microcapsule as claimed in claim 1, wherein component (b) is at least one chemical compound represented by general formula (I) in which $R_1$, $R_2$, $R_3$ and $R_4$ each represent a hydrogen atom or $C_1$-$C_3$ alkyl, with the proviso that at least one of $R_1$-$R_4$ is not a hydrogen atom.

7. The microcapsule as claimed in claim 6, wherein n is 0.

8. The microcapsule s claimed in claim 1, wherein components (b) is at least one chemical compound represented by general formula (II) where $R_5$ is $C_1$-$C_{12}$ alkyl, cyclohexyl, phenyl, benzyl or phenethyl.

9. The microcapsule as claimed in claim 8, wherein n is 0.

10. The microcapsule as claimed in claim 8, wherein n is 1.

11. The microcapsule as claimed in claim 8, wherein n is 2.

12. A reversible thermochromic sheet having a thermochromic coating comprising microcapsules according to claim 1.

* * * * *